Figures 1, 2:
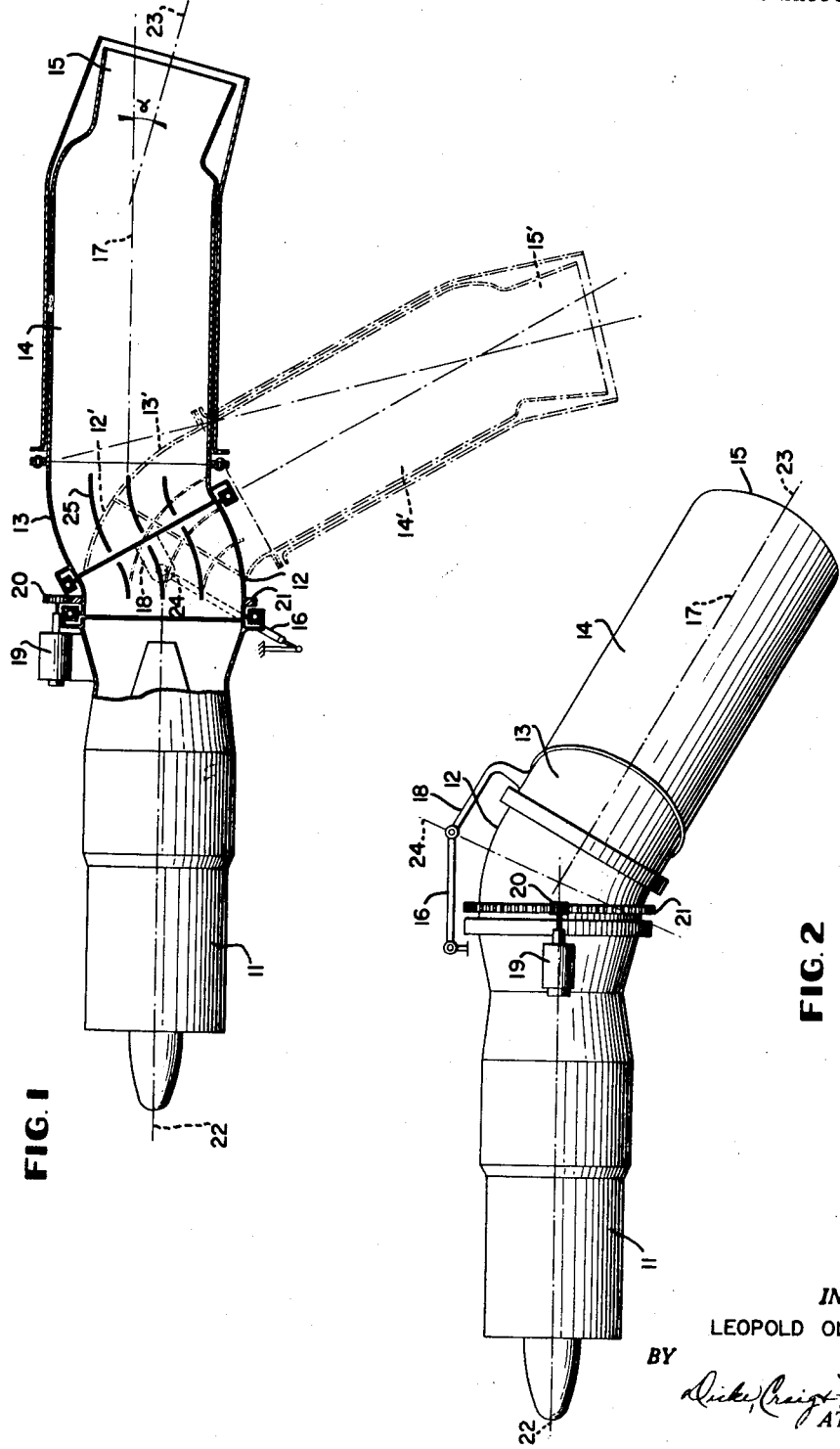

Dec. 11, 1962 L. OLBRICH 3,067,579
GAS TURBINE POWER PLANT
Filed Jan. 12, 1960 2 Sheets-Sheet 1

INVENTOR.
LEOPOLD OLBRICH
BY
*Dicke, Craig + Freudenberg*
ATTORNEYS

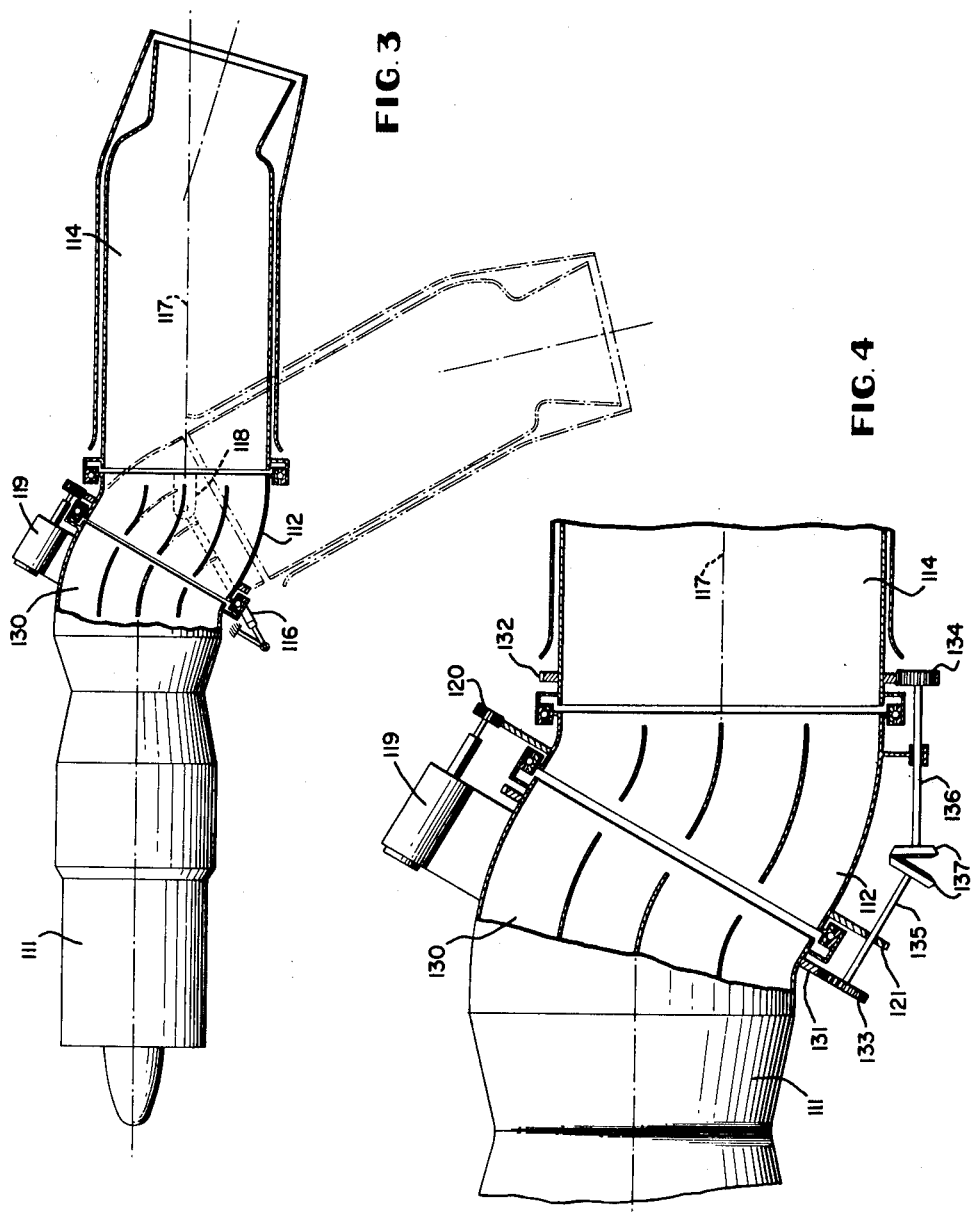

United States Patent Office 3,067,579
Patented Dec. 11, 1962

3,067,579
GAS TURBINE POWER PLANT
Leopold Olbrich, Stuttgart-Bad Cannstatt, Germany, assignor to Daimler-Benz Aktiengesellschaft, Stuttgart-Unterturkheim, Germany
Filed Jan. 12, 1960, Ser. No. 2,567
Claims priority, application Germany Jan. 17, 1959
12 Claims. (Cl. 60—35.55)

The present invention relates to a gas turbine propulsion plant and to an airplane equipped therewith, and more particularly relates to a pivoting arrangement of the afterburner for a gas turbine propulsion power plant, especially for installation in airplanes, designed to facilitate vertical take-offs or relatively short-distance take-offs of the airplane.

The present invention constitutes a further improvement of the type of gas turbine propulsion plant unit disclosed in the co-pending application Serial No. 810,106, filed April 30, 1959, in the name of Kurt Reiniger, and entitled "Gas Turbine Propulsion Plant and an Airplane Equipped Therewith," assigned to the assignee of the present application, the subject matter of which is incorporated herein insofar as necessary. According to the present invention, the afterburner of the gas turbine propulsion unit is pivotally arranged at the propulsion unit and, in particular, relates to the construction of the joint means and of the drive therefor for executing the pivotal movements of the afterburner.

The present invention is intended for use with gas turbine drive units which are provided for installation in airplanes of the vertical take-off or short-distance take-off type propelled by the thrust produced by the jet of gases discharged through a thrust nozzle.

The pivotal movement of the afterburner in accordance with the present invention from the normal position thereof, i.e. initial position thereof, is intended to effect a deflection of the driving gas jet for producing a reaction force directed at an angle to the longitudinal axis of the airplane in order to aid the airplane during starting and landing thereof by compensating for its weight or for a part thereof.

In the afore-mentioned co-pending application, the rotary joint is disposed either along the bottom side of the propulsion unit or at the airplane nacelle or at the bottom side of the wing or fuselage thereof between the gas-producing unit and the afterburner, whereby the gas-producing unit consists either exclusively of a gas turbine including compressor, combustion chamber and turbine rotor, or of a combination of a gas turbine with a ram jet drive unit. With the arrangement of the rotary joint outside of the resultant of the thrust jet, the external moment produced by the jet thrust has to be overcome by the adjusting mechanism in addition to the frictional forces occurring within the joint in case of pivotal movements of the afterburner. This free moment, however, always seeks to effect a pivotal return movement of the afterburner.

In order to avoid this disadvantage, a joint construction is proposed in accordance with the present invention which is characterized by an elbow member inserted between the rear end of the gas-producing unit and the forward end of the afterburner, which elbow member is rotatably supported at least with respect to the relatively stationary gas-producing unit.

According to another feature of the present invention, it is proposed to connect rotatably, in the circumferential direction, the elbow member with both the gas-producing unit as well as with the afterburner. The rotatable support also with respect to the afterburner is of advantage, especially when the longitudinal axis of the thrust nozzle rigidly secured at the rear end of the afterburner forms an angle with the longitudinal axis of the afterburner in such a manner that the first-mentioned longitudinal axis extends with a downward inclination; for in that case, the afterburner must not carry out any rotary movements about its own longitudinal axis as otherwise the angularly bent portion of the thrust nozzle would point upwardly with respect to the longitudinal axis of the afterburner.

Accordingly, it is an object of the present invention to provide a pivotal arrangement for a gas turbine propulsion plant which obviates the disadvantages noted hereinabove in connection with the prior art installations.

Another object of the present invention resides in the provision of a pivotal connection between the afterburner and the gas-producing unit of the gas turbine power plant of airplanes intended to enable a vertical or short-distance take-off, which is simple in construction, reliable in operation, and which absorbs all reaction moments occurring in the pivotal joint in a most effective manner.

These and other objects, features and advantages of the present invention will become more obvious from the following description when taken in connection with the accompanying drawing, which shows, for purposes of illustration only, several embodiments in accordance with the present invention and wherein FIGURE 1 is a side elevational view, with parts thereof broken away, of a gas turbine drive unit provided with a pivotally arranged afterburner having a thrust nozzle in which the afterburner is shown in full lines in the normal initial position thereof and in dot-and-dash lines in the fully swinging-out position thereof;

FIGURE 2 is a top plane view of the gas turbine drive unit of FIGURE 1, in which the afterburner has been pivoted about 90° from the normal position thereof, shown in full lines in FIGURE 1, FIGURE 3 is a side elevational view, partly in cross section, of a modified embodiment of a gas turbine drive unit, in accordance with the present invention, in which the afterburner is again shown in the normal position thereof in full lines and in the fully swung-out position in dot-and-dash lines, and FIGURE 4 is a partial cross-sectional view, on an enlarged scale, of a positive connection of the relatively stationary or fixed gas-producing unit with the afterburner, in accordance with the present invention.

Referring now to the drawing, wherein like reference numerals are used throughout the various views thereof to designate corresponding parts, and, more particularly, to FIGURES 1 and 2, reference numeral 11 designates therein the combustion gas-producing unit which may consist of a gas turbine of any known conventional construction, for example, including compressor, combustion chamber and turbine, or the like. Elbow member 12 is rotatably supported in the circumferential direction thereof at the rear end of the gas-producing unit 11. A further elbow member 13 adjoins the rotatable elbow member 12 which further elbow member 13 is rigidly connected with the afterburner 14. The thrust nozzle 15 is arranged at the rear end of the afterburner 14. The connection between the two elbow members 12 and 13 is also constructed so as to be rotatable in the circumferential direction thereof in the embodiment illustrated, for example, by suitable bearings or the like. The elbow member 13 and therewith the afterburner 14 are so operatively connected with respect to the relatively fixed gas-producing unit 11, by means of guide member 16 (FIGURE 2), that the afterburner 14 during pivoting movements thereof, cannot rotate about its own longitudinal axis 17. For that purpose, an arm 18 is rigidly connected at the elbow member 13 which is movably connected at one end thereof with the guide member 16, whereas the other end of the guide member 16 is pivoted at the gas-producing unit 11 or at the airplane nacelle. The movable connection between the arm 18 and the guide member 16 is disposed laterally of the rotatable elbow member 12 and is located on the transversely-directed main axis 24 of the elbow member 12 which extends through the center point of the latter.

If, during operation, the afterburner 14 is to be pivoted, then the elbow member 12 is rotated, for example, with the aid of a drive motor 19 by means of a pinion 20, driven by motor 19, and the toothed rim 21 arranged at the elbow member 12. The dot-and-dash lines of FIGURE 1 indicate the position 14' of the afterburner when it assumes its fully swung-out or completely pivoted position, i.e. the position in which it assumes the furthest pivoted position from the normal position thereof shown in full line. This position 14' of the afterburner is achieved by rotating the elbow member 12 through 180°. In this position, the individual parts of the drive unit are designated by reference numerals 12', 13', 14', and 15'. The longitudinal axis of the gas-producing unit 11 is designated in FIGURE 1 by reference numeral 22, whereas the longitudinal axis of the thrust nozzle is designated by reference numeral 23, which forms an angle $\alpha$ with the longitudinal axis 17 of the afterburner 14. Metallic guide members or guide vanes 25 are arranged within both elbow members 12 and 13.

During the pivoting operation, the afterburner 14 describes a circular arc. In FIGURE 2, which illustrates the entire drive unit in plan view, the elbow member 12 is already pivoted through 90° from the initial, normal position thereof, illustrated in full line in FIGURE 1, whereby the afterburner 14 is directed laterally downwardly with an incline. During starting and landing operations, the simultaneous lateral pivoting of the afterburner 14 is of advantage as the airplane can execute rotating movements about its vertical axis on the place already with a slightly retracted position of the afterburner 14, that is, when the latter is moved back only slightly from its completely swung-out position. This means that the airplane is extremely maneuverable about the vertical axis thereof under all flying conditions, that is, also during vertically directed take-off and landing flights.

In the embodiment of FIGURE 3, the rear end of the gas-producing unit 111 is formed into a rigid elbow member 130, for instance, by being formed integrally therewith, with which the elbow member 112 is connected rotatably in the circumferential direction thereof. A rotatable bearing of any suitable construction is also provided between the afterburner 114 and the elbow member 112. The guide member 116 prevents the afterburner 114 from rotating about its own longitudinal axis 117 during pivoting operations. The guide member 116, on the one hand, is pivotally secured at the airplane nacelle or at the gas-producing unit 111, and, on the other, at an arm 118 rigidly connected with the afterburner 114.

A modified embodiment of a positive coupling of the afterburner 114 with the rigidly installed gas-producing unit 111 is illustrated in FIGURE 4. This arrangement again serves the purpose of assuring that the afterburner 114, during pivot movements in the downward direction, does not rotate about its own longitudinal axis 117, and essentially consists of a planetary gear drive provided with a stationary toothed rim 131 on the elbow member 130 and of another toothed rim 132 identical with the first-mentioned toothed rim 131 which is secured on the afterburner 114. Gears 133 and 134 are in meshing engagement with the respective toothed rims 131 and 132, which are each mounted on the outer end of a respective shaft 135 and 136, which, in turn, extend at an angle with respect to each other and are rotatably supported on the elbow member 112, for example, in suitable bearing brackets. The two shafts 135 and 136 are operatively connected with each other by meshing bevel gears 137. The elbow member 112 is again positively driven from a motor 119 which drives the toothed rim 121 secured on the elbow member 112 by means of a pinion 120. Upon rotating of the elbow member 112, both pinion gears 133 and 134 roll off along the toothed rims 131 and 132.

The two different positions, i.e. parallel displacements, of the afterburner 14 or 114 in the normal retracted conditions with respect to the corresponding gas-producer unit which is disposed higher in FIGURE 1 and which is disposed lower in FIGURE 3, provide the possibility to adapt the installation of the entire drive unit to the spatial conditions of different types of airplanes.

The type of bearing support according to the present invention also permits a completely satisfactory sealing with respect to the atmosphere of the interior space which is under excess pressure. Furthermore, any number of guide vanes may be provided within the scope of the present invention which is not limited to any particular shape thereof, so that the most favorable deflection conditions for the driving gases may be realized by the construction in accordance with the present invention.

While I have shown and described several embodiments in accordance with the present invention, it is understood that the same is not limited thereto but is susceptible of many changes and modifications within the spirit and scope of the present invention, and I, therefore, do not wish to be limited to the details shown and described herein but intend to cover all such changes and modifications as are encompassed by the scope of the appended claims.

I claim:

1. A pivotal connection for the afterburner of a gas turbine jet propelled drive unit, for installation into vertical take-off or short distance take-off airplanes and the like, comprising combustion gas-producing means having a discharge outlet in said unit, afterburner means including an afterburner conduit, means pivotally connecting said afterburner conduit with said combustion gas-producing means including elbow means including an elbow conduit with the inlet and outlet planes thereof subtending an acute angle and rotatably supported in the circumferential direction thereof with respect to both said combustion gas-producing means and said afterburner conduit and conducting the discharge of said gas-producing means to the afterburner inlet in all positions of said rotary elbow conduit, drive means for controllably driving said elbow means, and means operatively connecting said afterburner conduit with said unit to prevent essentially completely any rotary movements of said afterburner conduit about a longitudinal axis of said afterburner conduit during controlled pivotal movements of said afterburner conduit whereby rotary movement of said elbow conduit produces pivotal motion of said afterburner conduit in a single plane.

2. A pivotal connection for the afterburner of a gas turbine drive unit, according to claim 1, wherein the arc of said rotatable elbow conduit points upwardly with said afterburner means in the retracted position thereof.

3. A pivotal connection for the afterburner of a gas turbine drive unit according to claim 1, wherein said last-mentioned means includes guide means movably supported at one end thereof at a relatively fixed part formed by one of said drive unit or airplane, arm means movably connected at one end thereof with the other end of said guide means and rigidly connected at the other end thereof with said afterburner means, and joint means movably connecting said other end of said guide means with said one end of said arm means disposed essentially on the main axis extending in the transverse direction of said elbow means.

4. A pivotal connection for the afterburner of a gas turbine drive unit according to claim 1, wherein said last-mentioned means for preventing rotatable movements of said afterburner means about the longitudinal axis thereof includes planetary gear drive means including an external gear provided at the rear end of said gas-producing means and an external gear provided at the forward end of said afterburner means, a planet gear each in meshing engagement with a respective external gear, both of said planet gears being of equal size, two shafts subtending an angle therebetween, each shaft supporting at the outer end thereof a respective planet gear, means rotatably supporting said shaft on said elbow means, and means positively connecting the inner ends of said shafts with each other for common rotation.

5. A pivotal connection for the afterburner of a gas turbine drive unit according to claim 1, wherein said drive means includes an external gear secured to said elbow means and a pinion driven by a drive motor and meshing with said external gear.

6. A pivotal connection for the afterburner of a gas turbine drive unit according to claim 1, wherein the arc subtended by said rotatable elbow means is approximately 30°.

7. A pivotal connection for the afterburner of a gas turbine drive unit according to claim 1, wherein said elbow means includes a rotatable elbow member, and said afterburner means includes a fixed elbow member, both of said elbow members subtending essentially the same angle.

8. A pivotal connection for the afterburner of a gas turbine drive unit according to claim 1, wherein said last-mentioned means include arm means rigidly connected at one end thereof with said afterburner means and operatively connected at the other end thereof with an essentially fixed portion of the airplane.

9. A pivotal connection for the afterburner of a gas turbine jet propelled drive unit for installation into vertical take-off or short distance take-off airplanes and the like, comprising combustion gas-producing means having a discharge outlet, afterburner means including an afterburner conduit having a longitudinal axis, nozzle means connected to said afterburner conduit and having a longitudinal axis rearwardly and downwardly inclined with respect to the longitudinal axis of said afterburner conduit, means for pivotally connected said afterburner means with said combustion gas-producing means including an elbow conduit having inlet and outlet planes thereof subtending an acute angle rotatably supported in a circumferential direction thereof with respect to both said combustion gas-producing means and said afterburner means, said elbow conduit conducting the discharge of said gas-producing means to the afterburner inlet in all positions of said elbow conduit, drive means for controllably driving said elbow conduit, and means operatively connecting said afterburner conduit with said unit to essentially prevent any rotary movements of said afterburner conduit about the longitudinal axis thereof during controlled pivotal movements of said afterburner conduit whereby rotary movement of said elbow conduit produces pivotal motion of said afterburner conduit essentially in a single plane.

10. A pivotal connection for the afterburner of a gas turbine drive unit according to claim 3, further comprising fixed elbow means connected to said combustion gas-producing means contiguous to said rotatably supported elbow means.

11. A pivotal connection for the afterburner of a gas turbine drive unit according to claim 3, further comprising fixed elbow means connected to said afterburner means positioned continguous to said rotatably supported elbow means.

12. A pivotal connection for the combustion gas conduit means of a gas turbine jet propelled drive unit for installation into vertical take-off or short distance take-off airplanes and the like, comprising combustion gas-producing means having a discharge outlet in said unit, combustion gas conduit means having a longitudinal axis, nozzle means connected to said combustion gas conduit means and having a longitudinal axis rearwardly and downwardly inclined with respect to the longitudinal axis of said combustion gas conduit means, means for pivotally connecting said combustion gas conduit means with said combustion gas-producing means including an elbow conduit with the inlet and outlet planes thereof subtending an acute angle rotatably supported in a circumferential direction thereof with respect to both said combustion gas-producing means and said combustion gas conduit means, said elbow conduit conducting the discharge of said gas-producing means to the inlet of said combustion gas conduit means in all positions of said elbow conduit, drive means for controllably driving said elbow conduit, and means operatively connecting said combustion gas conduit means with said unit to essentially prevent any rotary movements of said combustion gas conduit means about the longitudinal axis thereof during controlled movements of said combustion gas conduit means whereby rotary movement of said elbow conduit produces pivotal motion of said combustion gas conduit means in a single plane.

References Cited in the file of this patent
UNITED STATES PATENTS

| | | |
|---|---|---|
| 2,850,977 | Pollak | Sept. 9, 1958 |
| 2,857,740 | Hall et al. | Oct. 28, 1958 |
| 2,886,262 | Fletcher | May 12, 1959 |
| 2,919,546 | David | Jan. 5, 1960 |
| 2,933,891 | Britt | Apr. 26, 1960 |